United States Patent [19]

Miura

[11] Patent Number: 5,895,707
[45] Date of Patent: Apr. 20, 1999

[54] MAGNETIC RECORDING MEDIUM

[75] Inventor: Hiroshi Miura, Miyagi, Japan

[73] Assignee: Sony Corporation, Tokyo, Japan

[21] Appl. No.: 08/655,666

[22] Filed: May 30, 1996

[30] Foreign Application Priority Data

May 31, 1995 [JP] Japan .................. P07-134121

[51] Int. Cl.⁶ .............. B32B 27/08; B32B 27/20; B32B 27/30; B32B 27/40
[52] U.S. Cl. .............. 428/216; 428/323; 428/339; 428/423.1; 428/423.3; 428/424.6; 428/694 BU; 428/694 BP; 428/694 BS; 428/694 BR; 428/694 BN
[58] Field of Search .............. 428/141, 323, 428/480, 483, 694 B, 694 BU, 694 BS, 694 BR, 694 BN, 694 BM, 910, 900, 216, 339, 423.1, 423.3, 424.6, 694 BP

[56] References Cited

U.S. PATENT DOCUMENTS

| | | | |
|---|---|---|---|
| 5,318,828 | 6/1994 | Noguchi et al. | 428/212 |
| 5,366,795 | 11/1994 | Goto | 428/212 |
| 5,405,689 | 4/1995 | Usuki et al. | 428/323 |
| 5,419,943 | 5/1995 | Meguro et al. | 428/141 |
| 5,503,922 | 4/1996 | Shimasaki et al. | 428/323 |
| 5,567,502 | 10/1996 | Miyabara et al. | 428/141 |

*Primary Examiner*—Vivian Chen
*Attorney, Agent, or Firm*—Hill & Simpson

[57] ABSTRACT

A magnetic recording medium providing excellent electro-magnetic conversion characteristics and durability in a still playback mode. The magnetic recording medium comprises a non-magnetic substrate and a multi-layer film formed on said non-magnetic substrate, the multi-layer film comprising an upper magnetic layer containing a magnetic powder and a binder resin as main components, wherein the binder resin in the upper magnetic layer has a glass transition temperature Tg(u) of about 60° C. and comprises 1:1 mixture of a vinyl chloride copolymer and a polyurethane; and a lower non-magnetic layer containing a binder resin, wherein the binder resin in the lower non-magnetic layer has a glass transition temperature Tg(l) of about 35° C. and comprises 1:1 mixture of a vinyl chloride copolymer and a polyurethane. The upper magnetic layer also contains about 1 to about 20% by weight, based on the weight of magnetic powder, of an abrasive having an average particle size greater than the thickness of the upper magnetic layer.

4 Claims, 1 Drawing Sheet

MAGNETIC RECORDING MEDIUM

BACKGROUND OF THE INVENTION

1. Field of the Invention

This invention relates to a magnetic recording medium of a so-called overlapped coating type, and more particularly to improvement in an electromagnetic conversion characteristic and a durability of such a magnetic recording medium.

2. Description of the Prior Art

A magnetic recording media conventionally used, for example, in a video tape recorders (VTRs), include a so-called coating type magnetic recording medium whose magnetic layer is formed by applying a magnetic coating material prepared by mixing a magnetic powder, a binder resin, an organic solvent and other additives together, onto a non-magnetic substrate such as a polyester film, a so-called thin metal film type magnetic recording medium whose magnetic layer is formed by depositing a ferromagnetic material on a non-magnetic substrate using a thin film vacuum-deposition techniques, or the like. At present, the former coating type magnetic recording medium is predominately utilized due to its high productivity and wide applicability.

In such a magnetic recording medium, studies have been made to reduce a thickness of the magnetic layer in order to limit an output loss due to a recording demagnetization to a low level. However, in the case of the magnetic recording medium having only a single layer on a substrate, when a thickness of the magnetic layer is reduced, a non-uniformity on a surface of the substrate remarkably gives an adverse influence on a surface of the magnetic layer, so that the magnetic layer cannot have a sufficiently smooth surface.

Under this circumstance, there has been proposed a overlapped coating type magnetic recording medium having a plurality of coated layers. In such a overlapped coating type magnetic recording medium having a plurality of coated layers, an upper layer is formed as a magnetic layer and lower layers other than the upper layer can be a magnetic or non-magnetic layer. In such a magnetic recording medium, since the non-magnetic substrate is not in direct contact with the upper magnetic layer, a shape of the surface of the upper magnetic layer is not adversely affected by that of the surface of the non-magnetic substrate, so that a thin magnetic layer having a smooth surface can be formed on the magnetic recording medium.

Further, in the overlapped coating type magnetic recording medium, it is important to assure a traveling ability and a durability thereof. For instance, there is a suggestion that, if a glass transition point Tg(u) of the binder resin used in the upper magnetic layer and a glass transition point Tg(l) of the binder resin used in the lower layer satisfies the relationship of Tg(u) $\geq$Tg(l), the magnetic recording medium having excellent traveling ability and durability can be obtained.

However, in the event that the glass transition points Tg of the binder resins used are limited to such a particular range, the traveling ability and durability of the magnetic recording medium under high-speed frictional contact conditions, for example, in a still play-back condition, cannot be sufficiently improved though excellent traveling ability and durability are obtained under a low-speed frictional contact condition.

OBJECT AND SUMMARY OF THE INVENTION

It is therefore an object of the present invention to provide an overlapped coating type magnetic recording medium capable of exhibiting an improved durability even under a high-speed frictional contact condition.

In order to accomplish the a fore-mentioned object, the present inventors have made intense studies, so that it has been found that the durability under a high-speed frictional contact condition is considerably improved by adding to an uppermost magnetic layer which is brought into a direct slide contact with a magnetic head, an abrasive having an average particle size larger than a thickness of the layer.

Accordingly, in accordance with the present invention, there is provided magnetic recording medium including a non-magnetic substrate and a multi-layer film formed on said non-magnetic substrate and having an upper magnetic layer containing a magnetic powder and a binder resin as main components, and an abrasive, and a lower layer containing a binder resin, wherein a glass transition point Tg(u) of the binder resin contained in the upper magnetic layer and a glass transition point Tg(l) of the binder resin contained in the lower layer satisfy the relationship: Tg(l) $\leq$Tg(u), and the abrasive contained in the upper magnetic layer has an average particle size larger than a thickness of the upper magnetic layer.

In the overlapped coating type magnetic recording medium according to the present invention, the abrasive having an average particle size larger than the thickness of the upper magnetic layer is added to the upper magnetic layer. Further, the binder resins contained in the upper and lower layers are selected such that the glass transition points thereof satisfy the requirement of the equation: Tg(l) $\leq$Tg (u).

In the event that the glass transition point Tg(u) of the binder resin of the upper magnetic layer and the glass transition point Tg(l) of the binder resin contained in the lower layer satisfy the relationship of Tg(l) $\leq$Tg(u), a part of the abrasive can be buried into the lower layer even though the abrasive having an average particle size larger than the thickness of the upper magnetic layer is incorporated therein, whereby the abrasive is effectively prevented from being excessively exposed to an outer surface of the upper magnetic layer.

Thus, in the magnetic recording medium according to the present invention, since an abrasive having a larger average particle size can be used in the magnetic layer, a slide contact durability of the magnetic recording medium is effectively improved. In addition, since the abrasive is exposed to the outer surface of the upper magnetic layer to some extent, deterioration of an electromagnetic conversion characteristic of the magnetic recording medium is limited to a low level.

Accordingly, the present invention can accomplish improvement in a durability of the magnetic recording medium even when it is subjected to a high-speed frictional contact with a magnetic head while maintaining a good electromagnetic conversion characteristic thereof.

These and other objects, features and advantages of the present invention will become more apparent from the following detailed description when read in conjunction with the accompanying drawings and appended claims.

DETAILED DESCRIPTION OF THE INVENTION

A magnetic recording medium according to the present invention is of a so-called overlapped coating type having a plurality of coated layers on a non-magnetic substrate.

The coated layers (multi-layer film) formed on the non-magnetic substrate include an upper magnetic layer composed primarily of a magnetic powder and a binder resin. A lower layer of the coated layers may be a non-magnetic layer composed primarily of a non-magnetic pigment and a binder resin, or a magnetic layer composed primarily of a magnetic powder and a binder resin.

In the magnetic recording medium according to the present invention, in order to improve a traveling ability and a durability thereof, an abrasive is added to the upper magnetic layer. For this purpose, especially to enhance a durability of the magnetic recording medium under a high-speed frictional contact condition such as a still play-back mode, it is important that an average particle size of the abrasive to be added is larger than a thickness of the upper magnetic layer. This is because a large particle size of the abrasive can provide improved film properties such as a wear resistance and a durability in a still play-back mode due to a so-called pigment effect.

Figure 1:
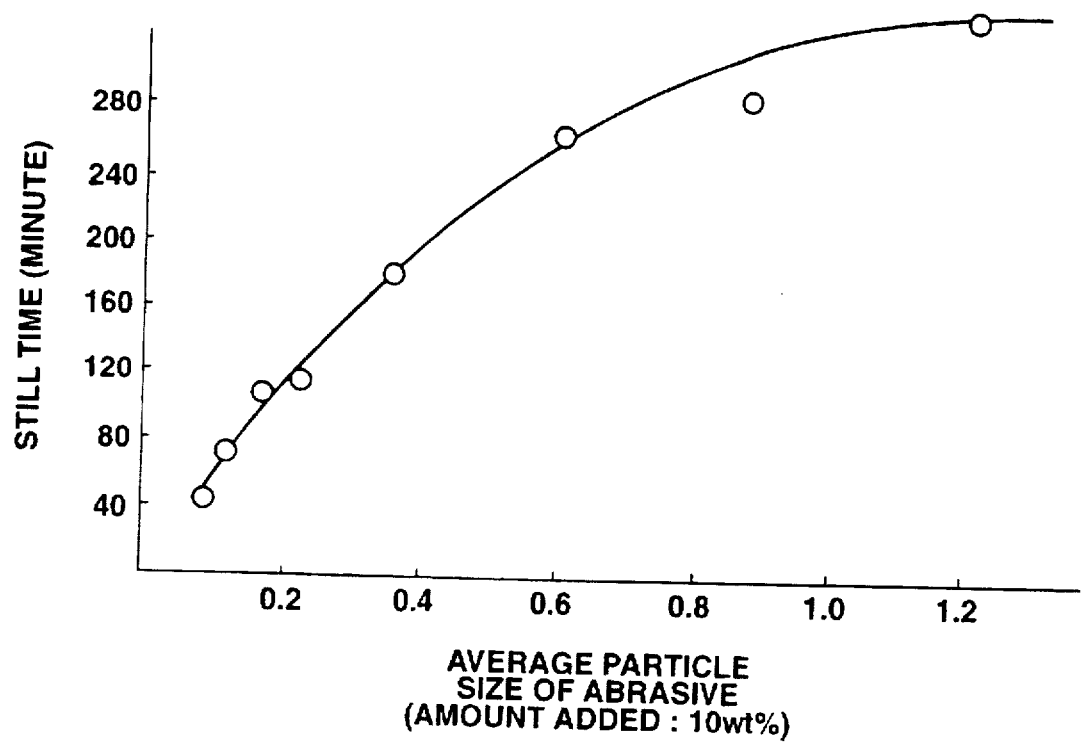
FIG. 1 is a graph showing a relation between a still endurance time and an average particle size of an abrasive used in a magnetic recording medium according to the present invention.

FIG. 1 and Table 1 show a relationship between the average particle size of alumina added as an abrasive and a durability in a still play-back mode (in terms of still endurance time) which has been obtained from actual experiments. In the experiment, the magnetic recording medium having a single magnetic layer having a thickness of 3 μm was tested. The amount of alumina added to the magnetic layer was 10 parts by weight based on the weight of the magnetic powder contained in the magnetic layer.

TABLE 1

| Particle size of alumina (μm) | Still endurance time (min.) |
| --- | --- |
| 0.08 | 42 |
| 0.12 | 71 |
| 0.18 | 108 |
| 0.22 | 115 |
| 0.35 | 180 |
| 0.6 | 262 |
| 0.87 | 291 |
| 1.2 | 360 |

As apparently understood from FIG. 1 and Table 1, it was confirmed that the larger the average particle size of the alumina the longer the still endurance time became. That is, as the particle size of the abrasive is increased, an effect of the addition of the pigment is more remarkably exhibited.

However, in the case where the abrasive has a larger particle size, a part of the abrasive is generally exposed to an outer surface of the magnetic layer, so that a spacing between the magnetic head and the magnetic recording medium is increased. As a result, an electromagnetic conversion characteristic of the magnetic recording medium is significantly deteriorated.

In the magnetic recording medium according to the present invention, the abrasive having a large average particle size is added to the upper magnetic layer. In addition, the magnetic recording medium according to the present invention satisfies the requirement that a glass transition point Tg(u) of the binder resin contained in the upper magnetic layer and a glass transition point Tg(l) of the binder resin contained in the lower layer have the relationship of $Tg(l) \leq Tg(u)$.

By using the binder resins which meet the aforementioned requirement, in case that the abrasive having a large average particle size is contained in the upper magnetic layer, a part of each particle of the abrasive is permitted to be buried into the lower layer by an adequate surface treatment such as a calendar treatment, so that the abrasive is prevented from being excessively exposed to an outer surface of the upper magnetic layer. Accordingly, even though the abrasive having a large average particle size is incorporated in the upper magnetic layer, the magnetic recording medium can exhibit a good electromagnetic conversion characteristic.

Meanwhile, the amount of the abrasive added to the upper magnetic layer is preferably in the range of 1 to 20% by weight based on the weight of the magnetic powder which is also contained in the upper magnetic layer. If the amount of the abrasive added is less than 1% by weight, the durability of the magnetic recording medium is insufficient. On the other hand, if the amount of the abrasive added exceeds 20% by weight, the electromagnetic conversion characteristic of the magnetic recording medium is deteriorated.

Further, it is preferred that the thickness of the upper magnetic layer be in the range of 0.05 to 1.0 μm. If the thickness of the upper magnetic layer exceeds 1.0 μm, a problematic output loss occurs due to recording demagnetization. On the other hand, the upper magnetic layer having a thickness of less than 0.05 μm is quite difficult to produce with a high accuracy.

Figure 2:
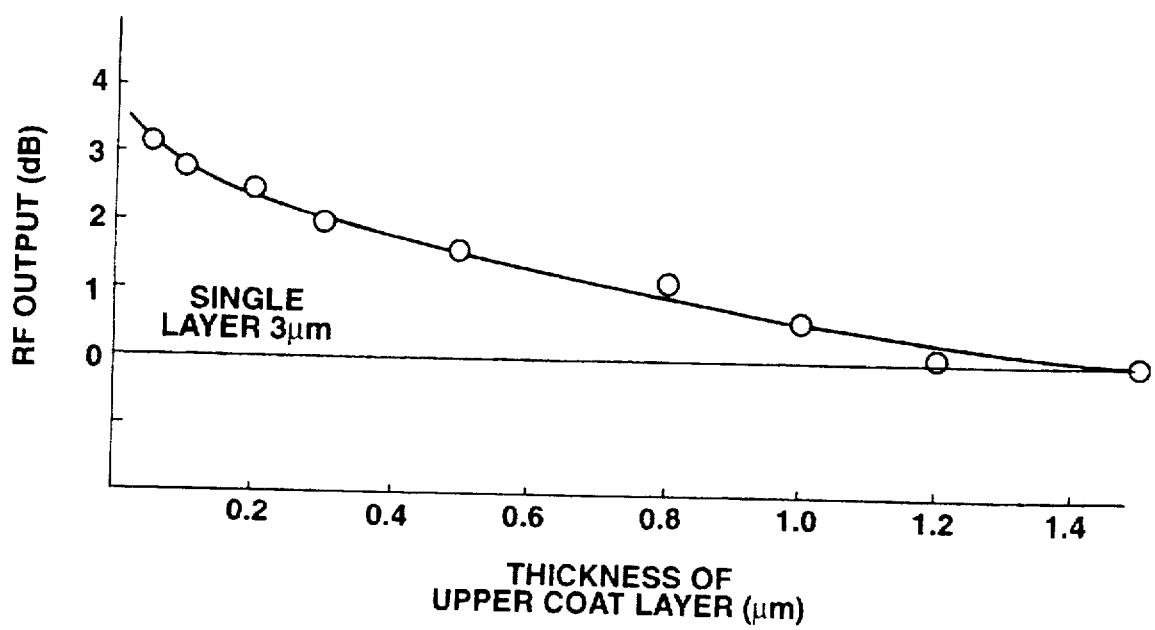
FIG. 2 is a graph showing a relation between an RF output and a thickness of an upper layer of the magnetic recording medium according to the present invention.

FIG. 2 and Table 2 show a relationship between an RF output and the thickness of the magnetic layer, which has been obtained from actual experiments in which a thickness of the lower layer was kept constant, namely 2 μm. Incidentally, each of the RF outputs in FIG. 2 and Table 2 were a relative value based on a reference value obtained in the case the magnetic layer was composed of a single layer having a thickness of 3 μm.

TABLE 2

| Thickness of upper layer (μm) | RF-output (dB) |
| --- | --- |
| 0.03 | Not available |
| 0.05 | 3.2 |
| 0.1 | 2.8 |
| 0.2 | 2.5 |
| 0.3 | 2 |
| 0.5 | 1.6 |
| 0.8 | 1.2 |
| 1 | 0.6 |
| 1.2 | 0.1 |
| 1.5 | 0 |
| 3.00(Singlelayer) | 0 |

It was recognized from FIG. 2 and Table 2 that, as the thickness of the upper magnetic layer was increased, the RF outputs became larger. However, the upper magnetic layer having a thickness of less than 0.05 μm was difficult to produce.

In the magnetic recording medium according to the present invention, the abrasive having an average particle size (average particle size of primary granules or coagulated secondary granules) larger than the thickness of the upper magnetic layer is added to the upper magnetic layer, and the glass transition points of the binder resins contained in the upper and lower layers of the magnetic recording medium is limited so as to satisfy the particular relationship.

Here, materials used in the upper or lower layers of the magnetic recording medium according to the present invention are described below.

Examples of the magnetic powder contained in the upper magnetic layer may include iron oxide-based ferromagnetic powder, chromium oxide-based ferromagnetic powder, metal-based ferromagnetic powder or hexagonal system ferrite powder. In addition, any magnetic powder normally contained in the conventional coating type magnetic recording medium is applicable in the present invention.

Further, examples of the abrasives used in the magnetic recording medium according to the present invention, may include powder of α-iron oxide, alumina, aluminum oxide, chromium oxide, titanium oxide, silica or the like. These powders used have an average particle size larger than the thickness of the upper magnetic layer. However, if the average particle size of the abrasive exceeds a total thickness of the upper layer and the other lower layers, the afore-mentioned effect that a part of the abrasive is buried into the lower layer cannot be obtained. Accordingly, it is required that the average particle size of the abrasive is smaller than the total thickness of the upper magnetic layer and the other lower layers (namely, the thickness of the multi-layer film) formed on the substrate of the magnetic recording medium.

Examples of the binder resins used in the upper magnetic layer may include polymers of compounds such as vinyl chloride, vinyl acetate, vinyl alcohol, vinylidene chloride, an acrylic acid ester, a methacrylic acid ester, styrene, butadiene, acrylonitrile or the like, a copolymer of two or more of the afore-mentioned compounds, a polyurethane resin, a polyester resin or an epoxy resin. The binder resins used in the upper magnetic layer have a glass transition point higher than that of the binder resins used in the lower layer.

The lower layer formed beneath the upper magnetic layer may be a magnetic or non-magnetic layer. In the case where the lower layer is a magnetic layer, the same magnetic powder and binder resin as exemplified above for the upper magnetic layer are applicable to the lower layer. In the case where the lower layer is a non-magnetic layer, a non-magnetic powder normally contained in an overlapped coating type magnetic recording medium can be used along with the afore-mentioned binder resin. However, it should be noted that the binder resin used in the lower layer has a glass transition point lower than that of the binder resin used in the upper magnetic layer.

Meanwhile, in addition to the afore-mentioned essential components, other additives normally contained in the coating type magnetic recording medium, such as a dispersant, a lubricant, anti-static agent, an anti-corrosive agent, a hardening agent or the like can be incorporated into the upper and lower layers in the multi-layer film of the magnetic recording medium, if desired.

The thus-constructed multi-layer film composed of the upper and lower layers is supported to the non-magnetic substrate as described above. Examples of the non-magnetic substrates include polymer substrates formed from polymer materials such as polyethylenes, polyesters, polyolefins, celluloses, vinyl resins, polyimides or polycarbonates, metal substrates formed from an aluminum alloy or a titanium alloy, ceramic substrates formed from aluminum glass, glass substrates or the like.

The overlapped coating type magnetic recording medium having the afore-mentioned multi-layer film on the substrate can be prepared in the following manner. The respective components for each layer are dispersed in an organic solvent and mixed together to prepare a coating material. The coating materials of the respective layers are coated on the non-magnetic substrate in an overlapping manner to form the multi-layer film. Alternatively, the overlappedly coated layers can be formed by using a simultaneous overlapped coating method (so-called wet-on-wet method) in which a die coater provided with a plurality of slit portions through which the respective layers are extruded is employed. The use of the latter method can provide a coated film having a good shape.

The organic solvent used in the preparation of the coating materials for the respective layers may be generally known organic solvents. Examples of the organic solvents may include ketones such as acetone, methylethyl ketone, methyl-iso-butyl ketone or cyclohexanone, esters such as methyl acetate, ethyl acetate, butyl acetate, ethyl lactate or acetic acid-glycol monoethyl ether, glycol ethers such as glycol dimethyl ether, glycol monoethyl ether or dioxane, aromatic hydrocarbons such as benzene, toluene or xylene, aliphatic hydrocarbons such as hexane or heptane, chlorinated hydrocarbons such as methylene chloride, ethylene chloride, carbon tetrachloride, chloroform, ethylene chlorohydrin or dichlorobenzene, or the like.

In addition to the afore-mentioned essential constituents, the magnetic recording medium according to the present invention may be further provided, on the upper magnetic layer, with a top coat containing a lubricant and anti-corrosive agent. Further, a back coat may be provided on a surface of the non-magnetic substrate opposite to the side where the upper and lower layers are coated, in order to improve a traveling ability or an anti-static property or transfer-preventive property, if desired. In this case, materials for the top and back coats may be those generally used in a conventional magnetic recording medium.

EXAMPLES

The present invention is described in more detail by way of examples below.

Experiment 1

This experiment was conducted to examine glass transition points of binder resins used in upper and lower layers of a magnetic recording medium, and a relationship between a thickness of the upper layer and an average particle size of an abrasive.

First, a magnetic coating material for the upper layer and a coating material for the lower layer were prepared in the following manner.

Respective components of the coating material for the upper layer were weighed as follows:

Composition of Coating Material for Upper Magnetic Layer

Metal magnetic powder (coercive force Hc: 1, 600 Oe, specific surface area: 51.5 $m^2/g$) 100 parts by weight Vinyl chloride-based copolymer 10 parts by weight Polyurethane resin 10 parts by weight Alumina powder having an average particle si ze enumerated in Table 3 below 10 parts by weight Myristic acid 1 part by weight Stearic acid ester 1 part by weight Isocyanate-based hardening agent 4 parts by weight The afore-mentioned composition was mixed with a solvent mixture composed of methylethyl ketone, toluene and cyclohexane to prepare a liquid mixture having a solid content of 35% by weight. The liquid mixture was then dispersed and intimately mixed together by means of a sand mill to prepare a magnetic coating material for the upper layer.

In addition, respective components of the coating material for the lower layer were weighed as follows.

Composition of Coating Material for Lower Layer
  α-iron oxide 100 parts by weight
  Vinyl chloride-based copolymer 10 parts by weight
  Polyurethane resin 10 parts by weight
  Stearic acid ester 1 part by weight
  Myristic acid 1 part by weight Similarly, the afore-mentioned composition was mixed with a solvent mixture composed of methylethyl ketone, toluene and cyclohexane to prepare a liquid mixture having a solid content of 35% by weight. The liquid mixture was then dispersed and intimately mixed together by means of a sand mill to prepare a coating material for the lower layer.

The thus-prepared coating materials for the upper and lower layers were coated on a non-magnetic substrate made of a polyethylene terephthalate (PET) film having a thickness of 7 μm, so that a lower layer having a thickness of 2 μm and an upper magnetic layer having a thickness of 0.2 μm were formed on the film. The upper magnetic layer was subjected to an orientation treatment and thereafter the layers were dried and then subjected to a calendar treatment and a curing treatment.

Successively, a back coat layer was formed on a surface of the non-magnetic substrate opposite to the side where the upper and lower layers were formed. The thus-produced magnetic film was sliced to form tapes.

According to the afore-mentioned procedure and compositions, there were prepared various kinds of sample tapes which involved a sample tape whose upper layer was composed of a binder resin having a higher glass transition point than that of a binder resin in the lower layer, a sample tape whose upper layer was composed of a binder resin having the same glass transition point as that of a binder resin in the lower layer, and a sample tape whose upper layer was composed of a binder resin having a lower glass transition point than that of a binder resin in the lower layer. Further, an average particle size of the abrasive contained in the upper layer of each sample tape was changed variously to prepare additional kinds of sample tapes. Incidentally, the glass transition points of the respective layers were adjusted by selectively using one kind of polyurethane resin having a glass transition point of 50° C. and another kind of polyurethane resin having a glass transition point of 0° C. For example, in the event that the polyurethane resin having a glass transition point of 50° C. was used together with the vinyl chloride-based copolymer having a glass transition point of 70° C. at a mixing ratio of 1:1, the resultant binder resin had a glass transition point of 60° C. On the other hand, in the event that the polyurethane resin having a glass transition point of 0° C. was used instead of that having a glass transition point of 50° C., the resultant binder resin had a glass transition point of 35° C.

The thus-prepared sample tapes were incorporated in a tape cassette and tested for examining an electromagnetic conversion characteristic and a durability upon a still play-back mode.

The glass transition points of the binder resins, average particle sizes of the alumina powder and results of the measurements are shown in Table 3.

Meanwhile, the electromagnetic conversion characteristic was evaluated in such a manner that a single frequency signal having a frequency of 7 MHz and a recording wave length of 0.49 μm was recorded on the magnetic sample tape and then reproduced to measure an RF output. Further, the reproduction output was a relative value obtained assuming that the reproduction output of the sample tape whose upper layer was composed of a binder resin having a higher glass transition point than that of the binder resin contained in the lower layer, and which contained the alumina powder having an average particle size of 0.35 μm in an amount of 10% by weight, was regarded as 0 dB.

Furthermore, the durability in a still play-back or reproduction mode was evaluated in the following manner. That is, the sample tape was loaded on a measuring device which was produced by modifying a 8 mm-video deck EV-S55 manufactured by Sony Corp. for exclusively measuring a durability in a still play-back or reproduction mode. The modified measuring device was operable in such a manner that algorithm for stopping the still play-back or reproduction was released so that the still play-back or reproduction was continued unless a stop command is generated. By using the measuring device, the sample tape was tested for a still durability at a temperature of −5° C. to measure an elapsed time required until the output of the sample tape was reduced by 3 dB from an initial output.

TABLE 3

| Upper layer Tg (°C.) | Lower layer Tg (°C.) | Amount of alumina added (%) 10 | | |
|---|---|---|---|---|
| | | Particle size of alumina (μm) | RF-output (dB) | Still endurance time (min.) |
| 60 | 35 | 0.12 | 1 | 3 |
| | | 0.18 | 0.4 | 5 |
| | | 0.22 | 0.3 | 120 |
| | | 0.35 | 0 | 180 |
| 60 | 60 | 0.12 | 1.1 | 3 |
| | | 0.18 | 0.4 | 5 |
| | | 0.22 | 0 | 130 |
| | | 0.35 | −0.2 | 200 |
| 35 | 60 | 0.12 | 1.3 | 1 |
| | | 0.18 | 0.6 | 2 |
| | | 0.22 | −0.3 | 150 |
| | | 0.35 | −1 | 240 |

As appreciated from Table 3, the comparison between sample tapes containing alumina powders having different average particle sizes revealed that the sample tape containing the alumina powder having an average particle size larger than a thickness of the upper layer was superior in durability upon a still play-back or reproduction mode to the sample tape containing the alumina powder having a smaller average particle size lower than the thickness of the upper layer. This indicates that it is advantageous, from the standpoint of improvement in slide durability, that an average particle size of the alumina powder contained in the upper layer is larger than the thickness of the upper layer.

However, in case that the glass transition point of the binder resin contained in the upper layer was lower than that of the lower layer, deterioration of the output became more remarkable when the average particle size of the alumina powder was larger than the thickness of the upper layer. Accordingly, it is required that the binder resin for the upper layer has the glass transition point higher than that of the lower layer.

Further, in both the cases where the binder resin for the upper layer had a glass transition point higher than that of the lower layer and where the binder resin for the upper layer had a glass transition point lower than that of the lower layer, occurrence of drop-out (value after subjected to 100 traveling cycles) was examined. The results are shown in Table 4.

TABLE 4

| Upper layer Tg (° C.) | Lower layer Tg (° C.) | Particle size of alumina (μm) | Drop-out (Number/min.) −10 dB/10 μsec. |
|---|---|---|---|
| 60 | 35 | 0.12 | 36 |
|  |  | 0.18 | 30 |
|  |  | 0.22 | 12 |
|  |  | 0.35 | 8 |

From Table 4, it was confirmed that a degree of the drop-out was varied remarkably according to the relation between glass transition points of the upper and lower layers. That is, the drop-out occurring in the case where the glass transition point of the binder resin in the upper layer was higher than that of the lower layer, was limited to a low level as compared with the drop-out occurring in the case where the glass transition point of the binder resin in the upper layer was lower than that of the lower layer.

Experiment 2

In this experiment, the amount of the alumina powder added as an abrasive to the upper layer of the magnetic recording medium was examined. First, various sample tapes which were different in amount of the alumina powder contained in the upper layer, were prepared in the same manner as described in Experiment 1. In each sample tape, a glass transition point of the binder resin used in the upper layer was higher than that of the binder resin used in the lower layer. The respective sample tapes were tested for the RF output and the still play-back durability in the same manner as described in Experiment 1. The are shown in Table 5.

TABLE 5

| Amount of alumina added (%) | Upper layer Tg = 60° C. Lower layer Tg = 35° C. Size of alumina (μm) | | | | | | | |
|---|---|---|---|---|---|---|---|---|
|  | 0.12 | | 0.18 | | 0.22 | | 0.35 | |
|  | RF* | ST** | RF | ST | RF | ST | RF | ST |
| 0.5 | 3.2 | 1 | 2.5 | 1 | 2.2 | 3 | 2 | 4 |
| 1 | 2.5 | 2 | 1.8 | 3 | 1.3 | 100 | 1.0 | 130 |
| 10 | 1 | 3 | 0.4 | 5 | 0.3 | 120 | 0 | 180 |
| 20 | 0.6 | 5 | 0.2 | 6 | 0.2 | 220 | −0.3 | 220 |
| 25 | 0.1 | 6 | 0 | 6 | −0.8 | 240 | −1 | 240 |
| Drop-out*** (number/min) | 36 | | 30 | | 12 | | 8 | |

10 dB/10 μsec.

Note:
*RF-output (dB);
**Still endurance time (min.); and
***Drop-out is a value after 100 traveling cycles at a normal temperature and normal humidity when the amount of alumina added is 10 %.

As appreciated from Table 5, it was confirmed that the sample tapes containing 1 to 20% by weight of the alumina powder in the upper layer all exhibited a good still play-back durability sufficient to bear a practical use.

On the other hand, when the amount of the alumina powder contained in the upper layer was less than 0.5% by weight, the sample tapes had a still endurance time (namely, the time required until the still play-back operation mode of the 8-mm video deck was automatically interrupted) of 7 minutes or lower. This indicated that such tapes were of no practical use. Conversely, when the amount of the alumina powder added to the upper layer exceeded 25% by weight, the sample tapes were inferior in an electromagnetic conversion characteristic, though it exhibited a high still play-back durability. These test results revealed that an adequate amount of the alumina powder to be added to the upper layer of the magnetic recording medium was in the range of 1 to 20% by weight.

What is claimed is:

1. A magnetic recording medium comprising:

a non-magnetic substrate having a surface;

a non-magnetic coating layer disposed on said surface comprising a binder resin having a glass transition point of about 35° C. comprising a 1:1 mixture of a vinyl chloride copolymer and a polyurethane; and an upper magnetic layer having a thickness of from about 0.05 to about 1.0 μm disposed on the non-magnetic coating layer comprising a binder resin having a glass transition point of about 60° C. comprising a 1:1 mixture of a vinyl chloride copolymer and a polyurethane, a magnetic metal powder and from about 1 to about 20% by weight based on the weight of said magnetic metal powder of an abrasive having an average particle size of greater than the thickness of said upper magnetic layer and less than the thickness of the non-magnetic coating layer and the upper magnetic layer combined.

2. A magnetic recording medium as defined in claim 1, wherein the non-magnetic coating layer has a thickness of about 2.0 μm.

3. A magnetic recording medium as defined in claim 1, wherein the abrasive present in the upper magnetic layer is partially buried into the non-magnetic coating layer.

4. A magnetic recording medium as defined in claim 1, wherein the non-magnetic coating layer has a thickness of about 2.0 μm, the upper magnetic layer has a thickness of about 0.2 μm and the abrasive present in the upper magnetic layer has an average particle size of 0.22 μm or more.

* * * * *